United States Patent
Dyor et al.

(10) Patent No.: US 9,111,113 B2
(45) Date of Patent: Aug. 18, 2015

(54) TRUSTED ONLINE ADVERTISING

(75) Inventors: Matt Dyor, Bellevue, WA (US);
Matthew Koontz, Bellevue, WA (US);
Michael C. Kunz, Seattle, WA (US);
Michael Goldbach, Albany, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 807 days.

(21) Appl. No.: 12/917,422

(22) Filed: Nov. 1, 2010

(65) Prior Publication Data

US 2012/0109746 A1    May 3, 2012

(51) Int. Cl.
*G06Q 99/00*     (2006.01)
*G06F 21/62*     (2013.01)
*G06Q 30/02*     (2012.01)

(52) U.S. Cl.
CPC ........ *G06F 21/6227* (2013.01); *G06Q 30/0201* (2013.01); *G06Q 30/0241* (2013.01); *G06Q 30/0251* (2013.01); *G06Q 30/0255* (2013.01); *G06Q 2220/00* (2013.01)

(58) Field of Classification Search
CPC .......... G06Q 30/0251; G06Q 30/0255; G06Q 2220/00
USPC ...................................... 705/14.49, 14.53, 50
See application file for complete search history.

(56) References Cited

U.S. PATENT DOCUMENTS

| | | | |
|---|---|---|---|
| 7,116,985 B2* | 10/2006 | Wilson et al. | 455/456.1 |
| 7,716,161 B2 | 5/2010 | Dean et al. | |
| 8,549,651 B2* | 10/2013 | Callahan et al. | 726/26 |
| 2004/0192339 A1* | 9/2004 | Wilson et al. | 455/456.1 |
| 2007/0255616 A1 | 11/2007 | Gjerstad et al. | |
| 2008/0109285 A1 | 5/2008 | Reuther et al. | |
| 2008/0275861 A1* | 11/2008 | Baluja et al. | 707/5 |
| 2008/0282290 A1* | 11/2008 | Malik et al. | 725/42 |
| 2009/0070310 A1 | 3/2009 | Srivastava et al. | |
| 2009/0164312 A1 | 6/2009 | Nadig | |
| 2009/0197616 A1 | 8/2009 | Lewis et al. | |
| 2010/0082440 A1 | 4/2010 | Vaidyanathan et al. | |
| 2010/0186066 A1* | 7/2010 | Pollard | 726/3 |
| 2011/0153414 A1* | 6/2011 | Elvekrog et al. | 705/14.43 |
| 2011/0161172 A1* | 6/2011 | Lee | 705/14.55 |
| 2011/0231240 A1* | 9/2011 | Schoen et al. | 705/14.41 |
| 2011/0270517 A1* | 11/2011 | Benedetti | 701/201 |

OTHER PUBLICATIONS

Kazienko, et al., "AdROSA—Adaptive Personalization of Web Advertising", Information Sciences, Jun. 2007, pp. 2269-2295, vol. 177, Issue 11, Elsevier Science Inc., New York, New York.

* cited by examiner

*Primary Examiner* — James D Nigh
(74) *Attorney, Agent, or Firm* — Sandy Swain; Judy Kadoura; Micky Minhas

(57) ABSTRACT

Online advertisements are delivered to one or more users. An authorization to access one or more data streams for a given user is received. The authorization is explicitly granted by the user. The data streams are stored within a user data repository. Upon the user conducting an online action that initiates a dynamic advertisement (DA) request, the authorized data streams for the user are used to generate a customized DA that is optimally relevant to the user. The customized DA is then delivered to the user. The customized DA is also monetized.

19 Claims, 5 Drawing Sheets ial
TRUSTED ONLINE ADVERTISING

BACKGROUND

Due to the explosive growth in the popularity and ubiquity of the Internet and World Wide Web in recent years, and motivated by huge potential business opportunities, the online advertising market continues to grow at a rapid pace. Correspondingly, online systems are experiencing a continually increasing volume of users who perform various Internet activities such as online information searches and webpage visits. Internet search engines generally allow advertisers to deliver relevant advertisements to users (i.e., prospective consumers) using online advertisement delivery systems. A given advertisement delivery system attempts to make the advertisements it delivers to a given user relevant to the user by taking into account the characteristics of the content of the online information that is delivered to the user, and also taking into account the characteristics of the user that may be known to or inferred by the advertisement delivery system.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Trusted online advertising technique embodiments described herein generally involve delivering online advertisements to one or more users. In an exemplary embodiment an authorization to access one or more data streams for a given user is received. The authorization is explicitly granted by the user. The data streams are stored within a user data repository. Upon the user conducting an online action that initiates a dynamic advertisements (DA) request, the authorized data streams for the user are used to generate a customized DA that is optimally relevant to the user. The customized DA is then delivered to the user. In another exemplary embodiment the customized DA is monetized.

DESCRIPTION OF THE DRAWINGS

The specific features, aspects, and advantages of the trusted online advertising (TOA) technique embodiments described herein will become better understood with regard to the following description, appended claims, and accompanying drawings where:

DETAILED DESCRIPTION

Figure 1:
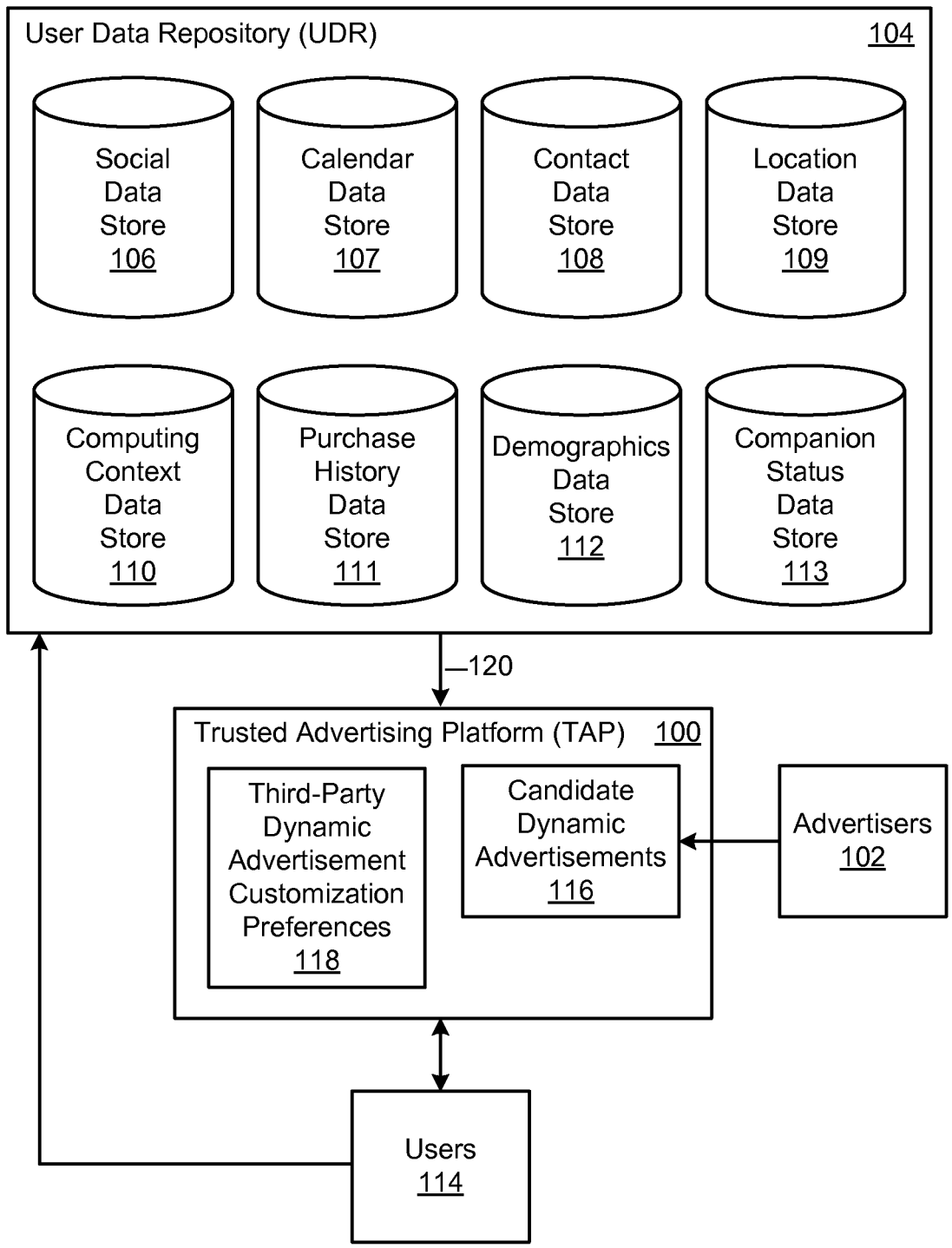
FIG. 1 is a diagram illustrating an exemplary embodiment, in simplified form, of an architectural framework for implementing the TOA technique embodiments described herein.

In the following description of trusted online advertising (TOA) technique embodiments reference is made to the accompanying drawings which form a part hereof, and in which are shown, by way of illustration, specific embodiments in which the TOA technique can be practiced. It is understood that other embodiments can be utilized and structural changes can be made without departing from the scope of the TOA technique embodiments.

The term "dynamic advertisement (DA)" is used herein to refer to an online advertisement whose formatting and content can be modified on-the-fly before it is delivered to a user. Exemplary DAs and related modifications thereto are described in more detail hereafter. The term "advertising opportunity" is used herein to refer to the occurrence of an online action conducted by a user that initiates a DA request. Examples of such an online action are described in more detail hereafter.

1.0 Online Advertising

As is appreciated in the art of online advertising and generally described heretofore, the role of an online advertisement delivery system (ADS) is to deliver online advertisements to users, where the advertisements delivered to a given user are relevant to the user. The advertisements are commonly placed within the online information (such as a webpage, among other things) that is delivered to the user. The ADS attempts to make a given advertisement relevant to a given user by taking into account the characteristics of the content of the current online information that is being delivered to the user, and also taking into account the characteristics of the user that may be known to or can be inferred by the ADS. An exemplary characteristic of the user that may be known to the ADS is the Internet Protocol (IP) address of the user's computing device which can be used to determine the user's general current physical location.

In the event that the ADS delivers an advertisement to a user that is not particularly relevant to the user, the user is less likely to interact with the advertisement. As a result, the advertisement will likely fail to generate interest in and demand for the products and/or services it is attempting to sell. Accordingly, the publisher of the advertisement (i.e., the advertiser) will likely fail to generate revenue from the advertisement. In other words, in this instance the ADS provided little to no value. It is noted that the relevance of an advertisement to a given user is not just based on which advertisement is delivered to the user. An advertisement's relevance to the user can also be based on other factors including, but not limited to, how the advertisement is presented to the user.

2.0 Trusted Online Advertising

Generally speaking, the TOA technique embodiments described herein use a trusted advertising platform (TAP) to deliver online advertisements to one or more users, where each advertisement delivered to a given user is customized to be optimally relevant to the user.

The TOA technique embodiments described herein are advantageous for a variety of reasons including, but not limited to, the following. As will be appreciated from the more detailed description that follows, the TOA technique embodiments provide a programmatic approach to generating a customized DA that is optimally relevant to each user for each different advertising opportunity. This advertisement customization includes programmatically optimizing both the format and content of the advertisement based on each user's current activities and interests. The TOA technique embodiments also provide additional value to each user by protecting their private personal data and the private personal data about their friends that are in their online social network. Thus, the TOA technique embodiments prevent such personal data from being exposed to unauthorized parties or being misused. In other words, the TOA technique embodiments do not directly communicate any data about the users or their online friends to the advertisers.

2.1 Architectural Framework

FIG. 1 illustrates an exemplary embodiment, in simplified form, of an architectural framework for implementing the TOA technique embodiments described herein. As exemplified in FIG. 1, the framework generally includes the aforementioned TAP 100 and a user data repository (UDR) 104. The UDR 104 generally includes one or more different data stores 106-113 each of which stores a different class of data about one or more users 114. In the particular architectural framework embodiment exemplified in FIG. 1 the UDR 104 includes a social data store 106, a calendar data store 107, a contact data store 108, a location data store 109, a computing context data store 110, a purchase history data store 111, a demographics data store 112, and a companion status data store 113, each of which are described in more detail hereafter. Alternate architectural framework embodiments (not shown) are also possible where the UDR 104 includes any subset of these data stores 106-113. Other architectural framework embodiments (not shown) are also possible where the UDR 104 includes additional data stores which store other classes of user data in addition to those exemplified in FIG. 1.

Referring again to FIG. 1, a set of candidate DAs 116 is delivered to the TAP 100 by one or more advertisers 102. As will be described in more detail hereafter, each user 114 explicitly grants the TAP 100 an authorization to access one or more data streams 120 for themself which are stored within the UDR 104. Such data streams 120 that a user 114 explicitly grants the TAP 100 an authorization to access are herein also simply referred to as "authorized data streams." Each user 114 can also optionally enter their third-party DA customization preferences 118 (hereafter simply referred to as "third-party preferences") into the TAP 100. These third-party preferences 118 are also described in more detail hereafter. For each different advertising opportunity that is initiated by a user 114 the TAP 100 can use the candidate DAs 116, authorized data streams 120, and optional third-party preferences 118 (if available) to generate a customized DA that is optimally relevant to the user.

Referring again to FIG. 1, the data stored in the UDR 104 about each user 114 is protected from unauthorized access/use for the following reasons. The TAP 100 cannot access a given data stream 120 for a given user until the user explicitly grants the TAP an authorization to access it. Furthermore, after a given user 114 grants the TAP 100 an authorization to access a given data stream 120, the user can retract the authorization at any time. Yet furthermore and as is described in more detail hereafter, the TAP 100 will not share the data stored in the UDR 104 about a user 114 with any third-party (such as an online friend of the user, among others) unless the user explicitly authorizes such sharing in their third-party preferences.

Referring again to FIG. 1, the social data store 106 generally includes online social graph data for each user 114. More particularly, in an exemplary embodiment of the TOA technique described herein the social data store includes a data stream for each user that enumerates the current online friends of the user (i.e., each person who is in the user's online social network). Alternate embodiments of the TOA technique are also possible where the social data store includes additional types of data streams that are related to the online social graph for each user.

Referring again to FIG. 1, the calendar data store 107 generally includes calendar data for each user 114 and in one embodiment at least one of their online friends, in accordance with each user's and each friend's express authorizations. More particularly, in one embodiment of the TOA technique described herein the calendar data store includes a data stream for each user that specifies the current calendar of the user. In another embodiment of the TOA technique the calendar data store includes another data stream for each user that specifies the current calendar of at least one online friend of the user. By way of specific example but not limitation, a user may authorize their calendar to be accessed by the TAP for the benefit of the user, and a user may separately authorize (or not authorize) their calendar to be accessed by the TAP for the benefit of others (such as friends of the user). The ability to authorize the TAP to access a data store for the benefit of the user and, separately, for the benefit of the user's social network applies to each of the data stores. In yet another embodiment of the TOA technique the calendar data store includes both of these data streams.

Referring again to FIG. 1, the contact data store 108 generally includes contact data for each user 114 and in one embodiment at least one of their online friends, in accordance with each user's and each friend's express authorizations. More particularly, in one embodiment of the TOA technique described herein the contact data store includes a data stream for each user that specifies ways to contact the user, where these ways include at least one of an email address for the user, or a text messaging address for the user, or a phone number for the user, among others. This data stream can optionally also include a thumbnail image of the user. In another embodiment of the TOA technique the contact data store includes another data stream for each user that specifies ways to contact at least one online friend of the user, where these ways include at least one of an email address for the friend, or a text messaging address for the friend, or a phone number for the friend, among others. This data stream can optionally also include a thumbnail image of at least one online friend of the user. In yet another embodiment of the TOA technique the contact data store includes both of these data streams.

Referring again to FIG. 1, the location data store 109 generally includes physical location data for each user 114 and in one embodiment at least one of their online friends, in accordance with each user's and each friend's express authorizations. More particularly, in one embodiment of the TOA technique described herein the location data store includes a data stream for each user that specifies the current physical location of the user. This data stream can optionally also specify at least one additional type of physical location data for the user such as their physical location history, or their favorite places, or physical locations that they checked into (by using a conventional application to check into a location check-in service such as Foursquare, Facebook Places, and the like), or future physical locations that they are planning to be in, among others. In another embodiment of the TOA technique the location data store includes another data stream for each user that specifies the current physical location of at least one online friend of the user. This data stream can optionally also specify at least one additional type of physical location data for at least one online friend of the user such as their physical location history, or their favorite places, or physical locations that they checked into, or future physical locations that they are planning to be in, among others. In yet another embodiment of the TOA technique the location data store includes both of these data streams.

Referring again to FIG. 1, the computing context data store 110 generally includes computing context data for each user 114 and in one embodiment at least one of their online friends, in accordance with each user's and each friend's express authorizations. More particularly, in one embodiment of the TOA technique described herein the computing context data store includes a data stream for each user that specifies the current computing context of the user, where this context includes at least one of data from a webpage that the user may currently be visiting, or data from a document that the user may currently be working on, or data from an online search that the user may have just conducted, or data from an application that the user may have just launched, or data from a question that the user may have just submitted to the TAP, among others. In another embodiment of the TOA technique, the computing context data store includes another data stream for each user that specifies the current computing context of at least one online friend of the user, where this context includes at least one of data from a webpage that the friend may currently be visiting, or data from a document that the friend may currently be working on, or data from an online search that the friend may have just conducted, or data from an application that the friend may have just launched, or data from a question that the friend may have just submitted to the TAP, among others. In yet another embodiment of the TOA technique the computing context data store includes both of these data streams.

Referring again to FIG. 1, the purchase history data store 111 and the demographics data store 112 generally include purchase history data and demographics data respectively for each user 114 and in one embodiment at least one of their online friends, in accordance with each user's and each online friend's express authorizations. The demographics data generally specifies the current demographics of the user and at least one of their online friends, where these demographics include at least one of the user's/friend's age, or the user's/friend's gender, or the user's/friend's children (if applicable), or the user's/friend's spouse (if applicable), among others.

Referring again to FIG. 1, the companion status data store 113 generally includes companion status data for each user 114 and in one embodiment at least one of their online friends, in accordance with each user's and each online friend's express authorizations. More particularly, in one embodiment of the TOA technique described herein the companion status data store includes a data stream for each user that specifies who, if anyone, the user is currently traveling with (such as their spouse and/or children, among others). In another embodiment of the TOA technique the companion status data store includes another data stream for each user that specifies who, if anyone, at least one online friend of the user is currently traveling with (such as their spouse and/or children, among others). In yet another embodiment of the TOA technique the companion status data store includes both of these data streams. Being able to access such companion status data is advantageous since a given user's third-party preferences 118 may be influenced by whether they are traveling alone, or traveling with their spouse, or traveling with their children, or traveling with both their spouse and children.

Referring again to FIG. 1, a given user's 114 third-party preferences 118 generally specify whether or not the authorized data streams 120 for the user can be integrated into customized third-party DAs (i.e., customized DAs that are delivered to the online friends and traveling companions of the user). In one embodiment of the TOA technique described herein the user's third-party preferences can sanction that the authorized data streams for the user be integrated into customized DAs that are delivered to any of the current online friends of the user and anyone that the user is currently traveling with. In another embodiment of the TOA technique the user's third-party preferences can prevent the authorized data streams for the user from being integrated into customized DAs that are delivered to any of the current online friends of the user and anyone that the user is currently traveling with. In yet another embodiment of the TOA technique the user's third-party preferences can sanction that the authorized data streams for the user be integrated into customized DAs that are delivered to just a prescribed subset of the current online friends of the user and anyone the user is currently traveling with (i.e., the authorized data streams for the user are prevented from being integrated into customized DAs that are delivered to online friends of the user and anyone that the user is currently traveling with that are not in the prescribed subset).

2.2 Process Framework

Figure 2:
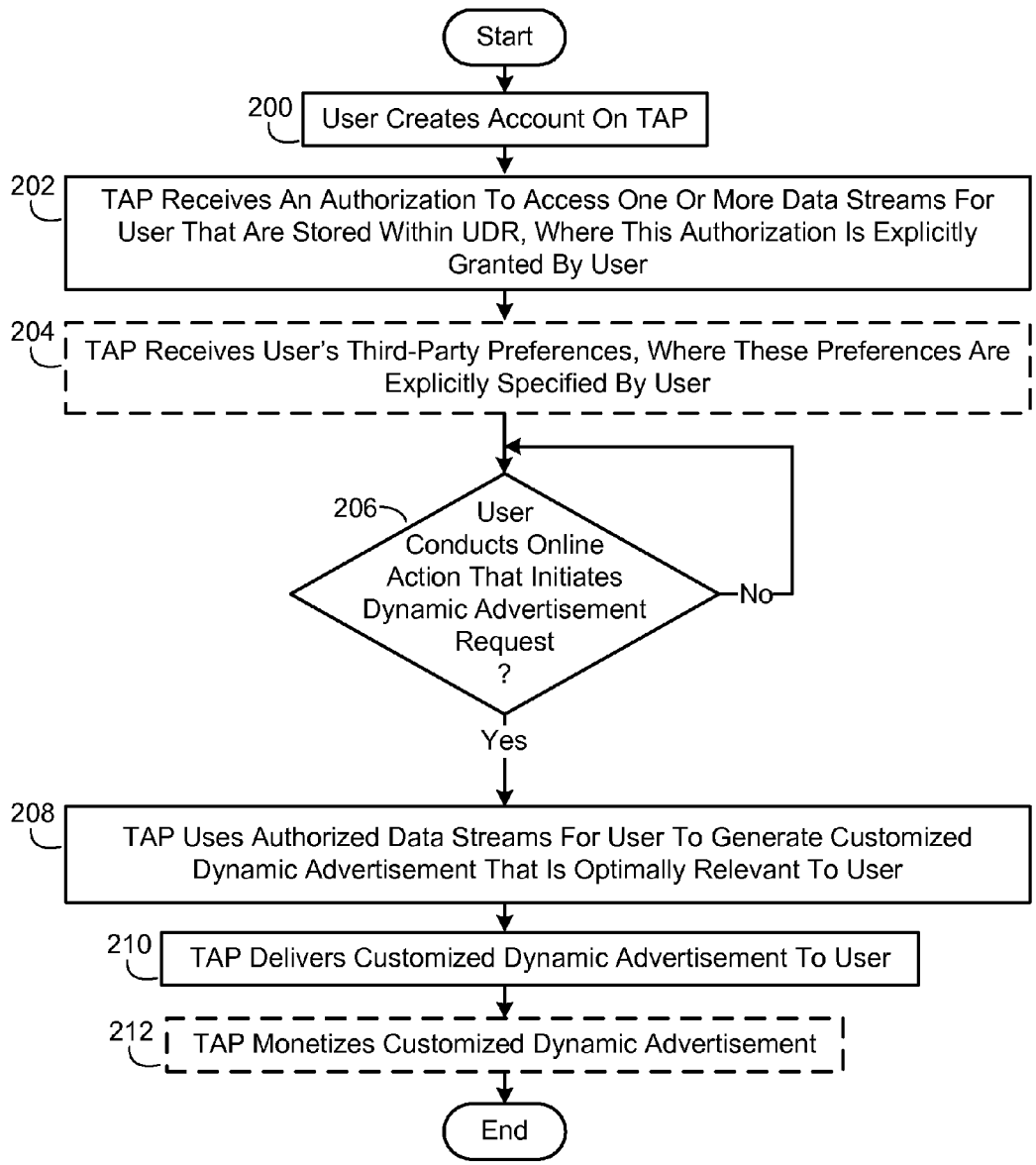
FIG. 2 is a flow diagram illustrating an exemplary embodiment, in simplified form, of a process framework for implementing the TOA technique embodiments described herein.

FIG. 2 illustrates an exemplary embodiment, in simplified form, of a process framework for implementing the TOA technique embodiments described herein. As exemplified in FIG. 2, the process starts in block 200 with a user creating an account on the TAP. In an exemplary embodiment of the TOA technique a secure user account is created where the user establishes a uniquely identifiable username and an associated password that enable the user to securely login to the account. The TAP then receives an authorization to access one or more data streams for the user that are stored within the UDR, where this authorization is explicitly granted by the user while they are logged into their account (block 202). The TAP can optionally also receive the user's aforementioned third-party preferences, where these preferences are explicitly specified by the user while they are logged into their account (block 204).

Referring again to FIG. 2, upon the user conducting an online action that initiates a DA request (block 206, Yes), the TAP will use the authorized data streams for the user to generate a customized DA that is optimally relevant to the user (block 208). The TAP then delivers the customized DA to the user (block 210). Exemplary online actions that can initiate a DA request include, but are not limited to, the user requesting a particular webpage, the user conducting an online search for a particular type of information, the user launching a particular application, and the user submitting a question to the TAP (such as "where would be a good place to go for lunch?"). In the case where the user requests a particular webpage, the customized DA is delivered to the user as part of the webpage. In the case where the user conducts an online search for a particular type of information, the customized DA is delivered to the user as part of the search results. In the case where the user launches a particular application, the customized DA is delivered to the user as part of the application user interface. In the case where the user submits a question to the TAP, the customized DA is delivered to the user as part of the answer to the question.

Referring again to FIG. 2, the TAP can optionally also monetize the customized DA (block 212). In an exemplary embodiment of the TOA technique described herein this monetization is performed by using an advertiser-provided preferences component of the customized DA to determine what to charge the advertiser for delivering the customized DA to the user. This preferences component is described in more detail hereafter, as are examples of using it to monetize customized DAs that are delivered to a user.

Figure 3:
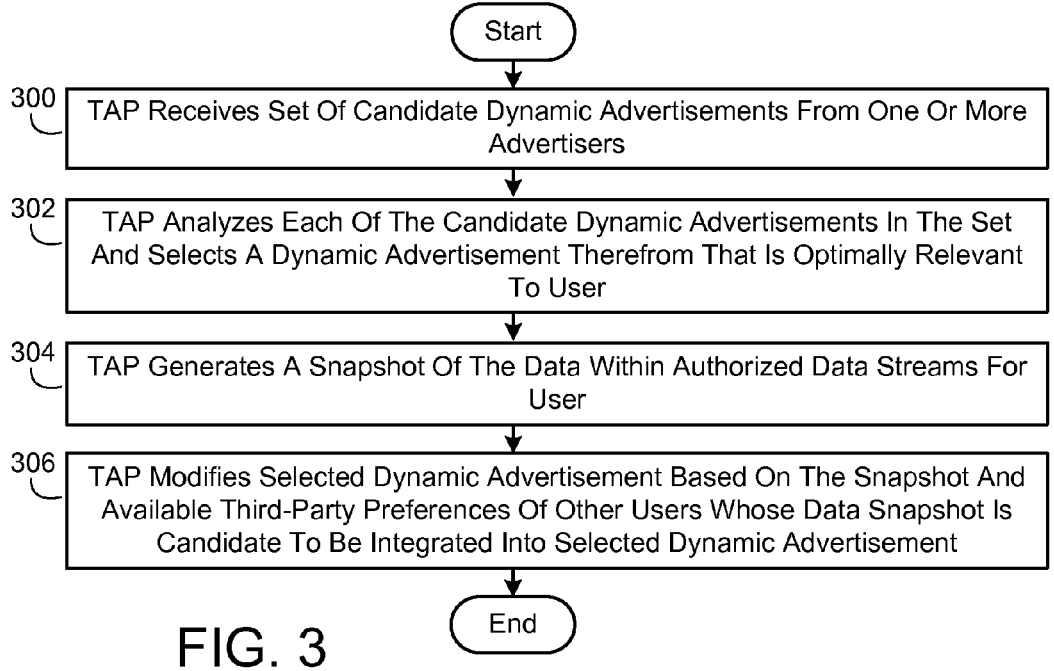
FIG. 3 is a flow diagram illustrating one embodiment, in simplified form, of a process for generating a customized dynamic advertisement (DA) that is optimally relevant to a user who conducts an online action that initiates a DA request.

FIG. 3 illustrates one embodiment, in simplified form, of a process for using the authorized data streams for the user to generate a customized DA that is optimally relevant to the user. As exemplified in FIG. 3, the process starts in block 300 with the TAP receiving a set of candidate DAs from one or more advertisers. The TAP then analyzes each of the candidate DAs in the set and selects a DA therefrom that is optimally relevant to the user (block 302). This analysis and selection are performed using a conventional advertisement selection method. The particular DA that is selected by the TAP from the set of candidate DAs is hereafter simply referred to as the "selected DA." The TAP then generates a snapshot of the data within the authorized data streams for the user (hereafter simply referred to as a "user data snapshot") (block 304). By way of example but not limitation, if the user explicitly grants the TAP authorization to access just the aforementioned data stream for the user that specifies their current physical location, and the aforementioned data stream for the user that specifies their purchase history, the user data snapshot will specify just the user's current physical location and purchase history. Finally, the TAP modifies the selected DA based on the user data snapshot and available third-party preferences of other users whose data snapshot is candidate to be integrated into the selected DA based on advertiser-provided components that are included therein (block 306). These advertiser-provided components are described in more detail hereafter. In other words and as is also described in more detail hereafter, in order to make the selected DA even more relevant to the user the TAP integrates selected aspects of the user data snapshot into the selected DA.

It will be appreciated that the user data snapshot generated by the TAP for a given user may also include certain types of data about the user's online friends and/or companions. By way of example, but not limitation, if the user grants the TAP an authorization to access a first data stream for the user that specifies their current physical location, and a second data stream for the user that enumerates their current online friends, and if each of these friends grants the TAP an authorization to access a data stream for themself that specifies their current physical location, then the user data snapshot generated by the TAP will include the current physical locations of the user and each of their current online friends. In this situation, if the advertiser-provided components that are included in the selected DA specify the use of data about a given online friend of the user, and if the third-party preferences of the friend specify that their authorized data streams can be integrated into customized DAs that are delivered to the user, then in addition to integrating selected aspects of the user data snapshot into the selected DA, the TAP will also integrate selected aspects of the friend's data snapshot into the selected DA.

Figure 4:
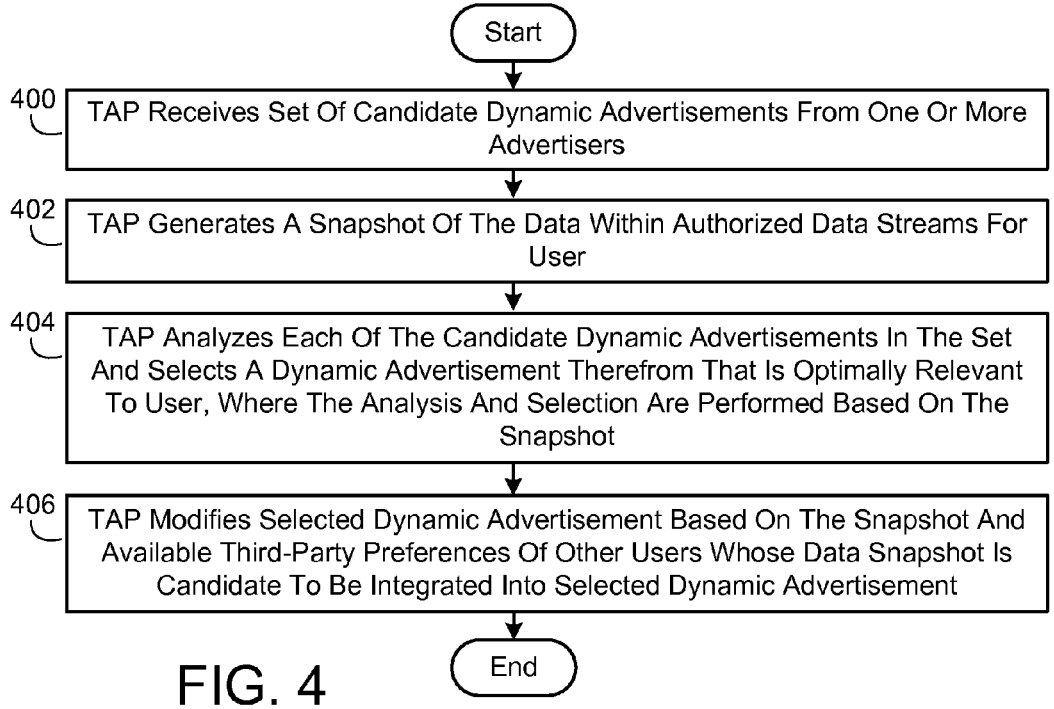
FIG. 4 is a flow diagram illustrating another embodiment, in simplified form, of a process for generating a customized DA that is optimally relevant to the user.

FIG. 4 illustrates another embodiment, in simplified form, of a process for using the authorized data streams for the user to generate a customized DA that is optimally relevant to the user. As exemplified in FIG. 4, the process starts in block 400 with the TAP receiving a set of candidate DAs from one or more advertisers. The TAP then generates a snapshot of the data within the authorized data streams for the user (i.e., the user data snapshot) (block 402). The TAP then analyzes each of the candidate DAs in the set and selects a DA therefrom that is optimally relevant to the user, where this analysis and selection are performed based on the user data snapshot (block 404). In other words, the TAP takes the user data snapshot into consideration when prioritizing the candidate DAs in the set and determining which advertisement is to be presented to the user. Various examples of the TAP taking the user data snapshot into consideration when prioritizing the candidate DAs are provided hereafter. Finally, the TAP modifies the selected DA based on the user data snapshot and available third-party preferences of other users whose data snapshot is candidate to be integrated into the selected DA based on advertiser-provided components that are included therein (block 406).

The UDR's data stores can be populated with user data in one or more ways including, but not limited to, the following. A user can directly input data about themself into a particular data store. Examples of this include a user directly inputting their social graph data into the social data store, and a user directly inputting their contact data into the contact data store, among others. The TAP can also receive an authorization to collect a particular type of data about a user, where this authorization is explicitly granted by the user while they are logged into their account. Upon receiving such an authorization, the TAP can collect the particular type of data about the user, and then input the collected data into the appropriate data store. Examples of this include, but are not limited to, the following. The TAP can collect calendar data for a user from a prescribed calendaring application based on the TAP receiving an authorization from the user to do so, and the TAP can then input the collected calendar data into the calendar data store. The TAP can also collect physical location data for a user based on the TAP receiving an authorization from the user to do so, and the TAP can then input the collected physical location data into the location data store.

It is noted that once a user has granted the TAP an authorization to access one or more data streams for the user, or an authorization to collect a particular type of data about the user, the user can subsequently grant the TAP an authorization to access additional data streams for the user, or an authorization to collect additional types of data about the user. The user can also subsequently retract any of such previously granted authorizations, where such a retraction is explicitly entered into the TAP by the user while they are logged into their account. It is further noted that once a user has specified their third-party preferences, the user can subsequently modify these preferences.

A user can employ various methods to grant the TAP (and subsequently retract from the TAP) access authorization to their data streams, and to grant the TAP (and subsequently retract from the TAP) authorization to collect data about themself, and to enter (and subsequently modify) their third-party preferences. By way of example but not limitation, in one embodiment of the TOA technique, once the user has successfully logged into their account they can utilize a dedicated account settings user interface to grant and subsequently retract access authorization to their data streams. The user can also utilize the account settings user interface to grant and subsequently retract authorization to collect their data. The user can also utilize the account settings user interface to enter and subsequently modify their third-party preferences. With particular regard to the user's data stream authorizations, in another embodiment of the TOA technique the customized DA generated by the TAP can optionally include a dislike button. The user can inform the TAP that they disapprove of a given advertisement that was delivered to them by selecting the dislike button (i.e., the user can select the dislike button within a given advertisement when the advertisement was not relevant enough to them). Upon the user selecting the dislike button within a given advertisement, the TAP determines that the user disapproves of the advertisement. The TAP can then either automatically ask the user to grant it an authorization to access a particular data stream for the user to which access is not yet authorized, or automatically ask the user to grant it an authorization to access any one or more of the data streams for the user to which access is not yet authorized.

2.3 Dynamic Advertisements (DAs)

This section provides a more detailed description of the aforementioned candidate DAs and exemplary ways in which they can be modified by the TOA technique embodiments described herein in order to make them optimally relevant to the users to which they are delivered. A given candidate DA generally includes one or more advertiser-provided components including, but not limited to, an advertiser-provided targeting criteria component, an advertiser-provided preferences component, an advertiser-provided snapshot integration executable code component, and an advertiser-provided media component. Each of these components will now be described in more detail.

In one embodiment of the TOA technique described herein, the advertiser-provided targeting criteria component of a candidate DA specifies one or more conditions to be met in order for the candidate DA to be selected for delivery to a given user. In other words, the targeting criteria component of a candidate DA specifies a first type of filter for the advertisement, where the advertisement will be filtered out by the TAP during the aforementioned determination of which advertisement is to be presented to the user if the conditions are not met. Many different conditions are possible in this embodiment. One exemplary condition is that the user grants the TAP authorization to access one or more specific data streams for the user (i.e., the advertisement is not eligible for delivery to the user unless the TAP is granted authorization to access the specific data streams). Another exemplary condition is that the user grants the TAP authorization to access one or more specific data streams for the user combined with one or more prescribed constraints within the specific data streams being met (i.e., the advertisement is not eligible for delivery to the user unless the TAP is granted authorization to access the specific data streams and the prescribed constraints are also met). Exemplary embodiments of such prescribed constraints include, but are not limited to, the user being within five miles of a particular venue or physical location, or the user having at least two online friends both of whom are free for at least the next 60 minutes.

In another embodiment of the TOA technique described herein, the advertiser-provided targeting criteria component of a candidate DA specifies one or more conditions when the candidate DA cannot be selected for delivery to a given user. In other words, the targeting criteria component of a candidate DA specifies a second type of filter for the advertisement, where the advertisement will be filtered out by the TAP during the determination of which advertisement is to be presented to the user if the conditions are met. Many different conditions are possible in this embodiment. One exemplary condition is that the advertisement utilizes specific user data that the TAP does not have authorization from the user to access. Another exemplary condition is be that the user is physically located more than five miles from a prescribed venue.

The advertiser-provided preferences component of a candidate DA specifies one or more characteristics that are of value to the candidate DA. Many different characteristics are possible. Exemplary embodiments of such characteristics are described hereafter. In one embodiment of the TOA technique described herein the characteristics are applied to a particular authorized data stream for a user. In another embodiment of the TOA technique the characteristics are applied to prescribed values within a particular authorized data stream for a user. Examples of both of these embodiments are also provided hereafter. As is also described in more detail hereafter, the TAP can utilize the characteristics during its aforementioned analysis of the candidate DAs and selection of one that is optimally relevant to the user. The TAP can also utilize the characteristics to monetize the customized DAs that are delivered to the users.

The advertiser-provided snapshot integration executable code component of a candidate DA includes logic that specifies at least one of how the candidate DA is to be formatted, or how the text of the candidate DA is to read, or how the aforementioned user data snapshot is to be integrated into the candidate DA. By way of example but not limitation, the logic of a given candidate DA may specify the following. A text block for the advertisement is to be overlaid onto a map that is centered on the midpoint between the most recent physical location that a user has checked into and a particular physical location or venue. The map has a zoom level so that both the user and the location/venue are visible. The map is to cover the left 60% of the advertisement. The text block is to be placed in the right 40% of the advertisement. The text block is to read "{USERNAME}, Come To Joe's Burger Joint Restaurant (It Is Only A {MINUTES_AWAY} Minute Drive), And Enjoy A Free Burger On Us."

The logic may optionally include conditional logic. By way of example but not limitation, the snapshot integration executable code component of a given candidate DA may specify that if the user data snapshot includes current physical location and contact data for the online friends of the user, and if one or more of the user's online friends {FRIEND_NAMES} is located within a prescribed range of the user's current physical location, the text block for the advertisement is to be modified to also read "If You Want To Invite {FRIEND_NAMES}, Click Here". The logic may optionally also include one or more overlay images along with instructions on how the images are to be overlaid onto the advertisement.

The advertiser-provided media component of a candidate DA includes one or more media elements that are to be integrated into the candidate DA by the TAP. Exemplary media elements include, but are not limited to, an image, video, and audio.

Various types of customized DAs can be generated by the TAP from the aforementioned selected DA including, but not limited to, a pure text advertisement, an advertisement that integrates advertiser-provided media (hereafter simply referred to as an "integrated advertisement"), and an advertisement that does not integrate advertiser-provided media (hereafter simply referred to as a "non-integrated advertisement"). Each of these exemplary types of customized DAs will now be described in more detail.

Figure 5A:
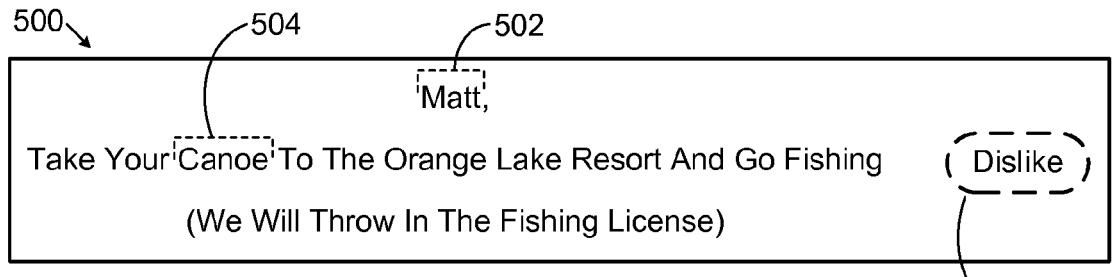
FIGS. 5A-5C are diagrams illustrating exemplary embodiments, in simplified form, of customized DAs that are generated using the TOA technique embodiments described herein.

FIG. 5A illustrates an exemplary embodiment, in simplified form, of a pure text advertisement that is generated using the TOA technique embodiments described herein. This particular embodiment assumes that the following situation exists. A DA request is initiated by a user (named "Matt")

who has explicitly granted the TAP an authorization to access data streams that specify his current physical location and his purchase history (in this situation Matt recently purchased a canoe). Furthermore, the selected DA does not have an advertiser-provided media component, but it does have an advertiser-provided snapshot integration executable code component which includes logic specifying that a text block for the advertisement is to read "{USERNAME}, Take Your {PURCHASED_FISHING_ITEM} To The Orange Lake Resort And Go Fishing (We Will Throw In The Fishing License)". In this situation the offer (i.e., a free fishing license) is specified/hard-coded by the advertiser-provided snapshot integration executable code component of the selected DA. Other situations are also possible where the offer is dynamically determined. Examples of such other situations include, but are not limited to, the offer being dynamically determined based on items that the user has historically purchased, or based on items that the user previously purchased and may have expired or run out (such as a fishing license or bait, among others), or based on items that the user has not yet purchased.

The resulting pure text advertisement 500 that is generated by the TAP and delivered to Matt in this situation is exemplified in FIG. 5A. Based on the logic, the user's name 502 and the fishing item they purchased 504 are integrated into the advertisement 500. The advertisement 500 also includes the aforementioned optional dislike button 534 which the user can select to inform the TAP that they disapprove of the advertisement. It will be appreciated that the TAP just accesses first-party data for the advertisement exemplified in FIG. 5A. In other words, the TAP just accesses user data for the user themself and not for their online friends or companions.

Figure 5B:
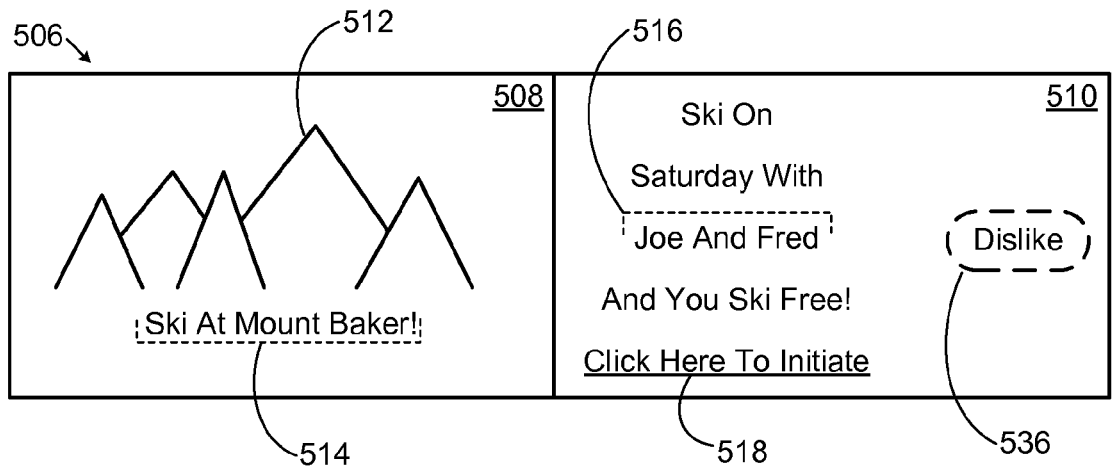

FIG. 5B illustrates an exemplary embodiment, in simplified form, of an integrated advertisement that is generated using the TOA technique embodiments described herein. This particular embodiment assumes that the following situation exists. A DA request is initiated by a user who has explicitly granted the TAP an authorization to access data streams that specify his current physical location. Additionally, the user has two friends, based on a social graph, and these two friends (named "Joe" and "Fred") have sanctioned that their authorized data streams can be integrated into a customized DA that is delivered to a friend. The selected DA has an advertiser-provided media component which includes an image of a prescribed ski resort (in this case, Mount Baker). The selected DA also has an advertiser-provided snapshot integration executable code component which includes logic specifying that an overlay text block for the image is to read "Ski At Mount Baker!". The logic further specifies that an additional text block for the advertisement is to read "Ski On Saturday With {COMPANION_NAMES} And You Ski Free!". The logic yet further specifies a hyperlink that reads "Click Here To Initiate". The resulting integrated advertisement 506 that is generated by the TAP (and subsequently delivered to the user by the TAP) in this situation is illustrated in FIG. 5B.

As exemplified in FIG. 5B, the integrated advertisement 506 includes an advertiser-provided media region 508 and a customized content region 510. Based on the logic, the image 512 and overlay text block 514 are displayed within the advertiser-provided media region 508. Also based on the logic, the names of the user's companions 516 are integrated into the additional text block which is displayed within the customized content region 510, and the hyperlink 518 is also displayed within this region. The advertisement 506 also includes the aforementioned optional dislike button 536 which the user can select to inform the TAP that they disapprove of the advertisement. It will be appreciated that the TAP accesses third-party data for the advertisement exemplified in FIG. 5B. In other words, the TAP accesses user data for the user's companions.

Generally speaking, upon a user selecting a hyperlink that is included within an integrated advertisement which is delivered to the user, the TAP can perform one or more prescribed actions associated with facilitating the user's involvement with what is being advertised in the advertisement (such as the such as the user's purchase of a product or service that is being advertised, or the user's attendance at or participation in an event that is being advertised, or the like). With particular regard to FIG. 5B, upon the user selecting the hyperlink 518, the TAP can perform one or more prescribed actions associated with facilitating the ski trip. Examples of such actions include, but are not limited to, the following. The TAP can facilitate a communication with Joe on a first communication channel that is currently appropriate for Joe, and the TAP can facilitate another communication with Fred on a second communication channel that is currently appropriate for Fred. The TAP can determine the communication channel that is currently appropriate for a given user based on data that is in the aforementioned user data snapshot such as the aforementioned ways in which the user can be contacted. In other words, the TAP might facilitate an email to Joe and a phone call to Fred so that the user can discuss the idea of going on the ski trip with them. Additionally, either in advance of, or in conjunction with, or after facilitating this communication with Joe and Fred, the TAP can also perform additional actions associated with facilitating the ski trip such as purchasing tickets, making reservations, and the like.

Figure 5C:
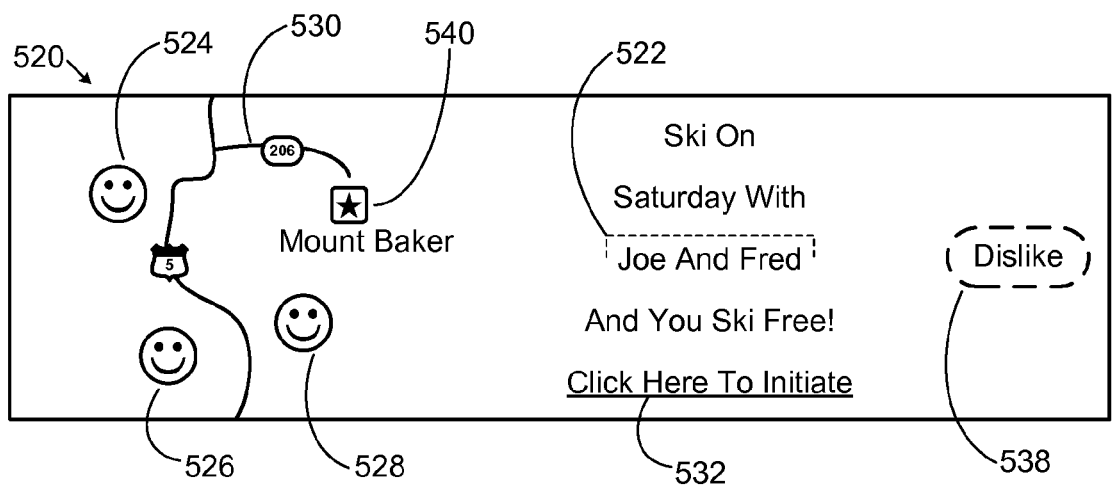

FIG. 5C illustrates an exemplary embodiment, in simplified form, of a non-integrated advertisement that is generated using the TOA technique embodiments described herein. This particular embodiment assumes that the following situation exists. A DA request is initiated by a user who has explicitly granted the TAP an authorization to access data streams that specify their current physical location, their online friends, (in this situation two of their online friends are named "Joe" and "Fred", both of whom are currently located within ten miles of Mount Baker), and a thumbnail image of their self. The user's online friends (Joe and Fred) have each explicitly granted the TAP an authorization to access data streams that specify their current physical location and a thumbnail image of their self. The third-party preferences of both Joe and Fred sanction that their authorized data streams can be integrated into a customized DA that is delivered to the user. The selected DA does not have an advertiser-provided media component, but it does have an advertiser-provided snapshot integration executable code component which includes logic specifying that a text block for the advertisement is to read "Ski On Saturday With {ONLINE_FRIENDS_LOCATED_WITHIN_20_MILES_OF_MOUNT_BAKER} And You Ski Free!". The logic yet further specifies a hyperlink that reads "Click Here To Initiate". The resulting non-integrated advertisement 520 that is generated by the TAP (and subsequently delivered to the user by the TAP) in this situation is illustrated in FIG. 5C.

As exemplified in FIG. 5C, the non-integrated advertisement 520 includes a map image 530 which directs the user to a prescribed ski resort (in this case, Mount Baker 540), where the map image is programmatically generated by the TAP. The thumbnail images of the user 524, and their online friends 526 and 528 that are currently located within 20 miles of Mount Baker are also integrated into the advertisement 520, where the image of each user is placed generally on top of their current physical location. Based on the logic, the names of the user's online friends 522 that are currently located within 20 miles of Mount Baker are integrated into the text block which is also displayed within the advertisement 520, and the hyperlink 532 is also displayed within the advertisement. Upon the user selecting the hyperlink, the TAP can perform one or more prescribed actions associated with facilitating the ski trip as described heretofore. The advertisement 520 also includes the aforementioned optional dislike button 538 which the user can select to inform the TAP that they disapprove of the advertisement.

2.4 Monetization Of Dynamic Advertisements (DAs)

As is appreciated in the art of online advertising, two common ways (among others) in which advertisers pay for online advertisements are CPM (cost per mille—also known as cost per thousand) and CPA (cost per action). In the CPM model an advertiser pays for each thousand deliveries of an advertisement to users. In the CPA model an advertiser pays whenever a user to whom an advertisement is delivered completes a prescribed action in response to the advertisement. Exemplary prescribed actions include, but are not limited to, the user clicking on the advertisement and making a purchase therefrom, or the user completing a sign-up therefrom.

Generally speaking, the TAP bills an advertiser (i.e., charges the advertiser a monetary fee) for delivering online advertisements to users that are generated from candidate DAs which the TAP received from the advertiser. The TOA technique embodiments described herein can monetize the delivered online advertisements (i.e., determine the particular monetary fee to charge a given advertiser for delivering one of their candidate DAs to a given user) in various ways which will now be described in more detail. As described heretofore, the advertiser-provided preferences component of a given candidate DA specifies one or more characteristics that are of value to the candidate DA. An example of such a characteristic is a price the advertiser is willing to pay for the delivery of a candidate DA to a user. This price can be specified as either a prescribed CPM, or a prescribed CPA, or a prescribed CPM increase, or a prescribed CPA increase, among other ways. Examples of how the TAP can utilize such a characteristic to monetize an online advertisement that is delivered to a user will now be provided.

Consider a situation where the aforementioned set of candidate DAs includes a first DA whose preferences component specifies a first CPM, and a second DA whose preferences component specifies a second CPM. Given a user that conducts an online action that initiates a DA request, in the case where the TAP has received no authorization to access any data streams for the user, the first CPM is higher than the second CPM. However, in the case where the user has granted the TAP an authorization to access one or more of their data streams, the second CPM is higher than the first CPM. In this situation, based on the preferences components of the first and second DAs the TAP may select the first DA and customize it for delivery to the user whenever the user does not grant the TAP an authorization to access any of their data streams. TAP may select the second DA and customize it for delivery to the user whenever the user does grant the TAP an authorization to access one or more of their data streams.

The aforementioned price an advertiser is willing to pay for the delivery of a candidate DA to a user can also be specified as either a prescribed CPM or CPM increase for one or more particular data streams for a user that the user grants the TAP an authorization to access and are integrated into the candidate DA when it is delivered to the user. By way of example, but not limitation, consider another situation where a given candidate DA has a preferences component that specifies that the CPM be increased a first prescribed amount whenever the candidate DA is delivered to a user who grants the TAP an authorization to access a data stream for the benefit of the user that specifies their current physical location. The preferences component of the candidate DA also specifies (by way of example but not limitation) that the CPM may be increased by an additional second prescribed amount whenever a second user also grants the TAP an authorization to access the second user's data stream for the benefit of the first user. By way of specific example but not limitation, the data stream may specify the location of a user's friends, and the user's friends may have authorized the TAP to access their data stream in order to present a customized DA to their friends. Assuming the TAP selects the candidate DA for delivery to the user, whenever the TAP's modification of the candidate DA includes integrating the user's current physical location data the TAP will increase the CPM by the first prescribed amount; whenever the TAP's modification of the candidate DA includes integrating both the user's physical location data and their online friend's physical location data the TAP will increase the CPM by an amount equal to the first prescribed amount plus the second prescribed amount.

Based on the fact that the TAP may be granted an authorization to access a data stream for a given user that specifies their current physical location, and/or another data stream for the user that specifies their purchase history, the TAP can also bill an advertiser whenever the user completes prescribed types of offline activity after one of the advertiser's candidate DAs being delivered to the user by the TAP. More particularly and by way of example but not limitation, if the TAP determines that the user checked into a venue that was advertised in a customized DA which was delivered to a user, and the customized DA was generated by the TAP from a candidate DA it received from a given advertiser, the TAP can bill the advertiser for the user's checking into the venue. If the TAP determines that the user made a purchase at a physical retail location that was advertised in a customized DA which was delivered to a user, and the customized DA was generated by the TAP from a candidate DA it received from a given advertiser, the TAP can bill the advertiser for the user's making the purchase.

3.0 Additional Embodiments

While the TOA technique has been described by specific reference to embodiments thereof, it is understood that variations and modifications thereof can be made without departing from the true spirit and scope of the TOA technique. By way of example but not limitation, although the TOA technique embodiments described herein are described in the context of the TAP utilizing a user data snapshot that is generated from one or more data streams for the user that the TAP is authorized to access, an alternate embodiment of the TOA technique is possible where the user data snapshot also includes data about the user that is inferred by the TAP. Additionally, although the TOA technique embodiments are described in the context of each of the data streams for a given user being stored within the UDR, an alternate embodiment of the TOA technique is possible where one or more of the data streams for the user are accessed from a third-party data repository as needed.

It is also noted that any or all of the aforementioned embodiments can be used in any combination desired to form additional hybrid embodiments. Although the TOA technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

This section provides a brief, general description of a suitable computing system environment in which portions of the TOA technique embodiments described herein can be implemented. These TOA technique embodiments are operational with numerous general purpose or special purpose computing system environments or configurations. Exemplary well known computing systems, environments, and/or configurations that can be suitable include, but are not limited to, personal computers (PCs), server computers, hand-held devices (such as mobile phones and the like), laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 6:
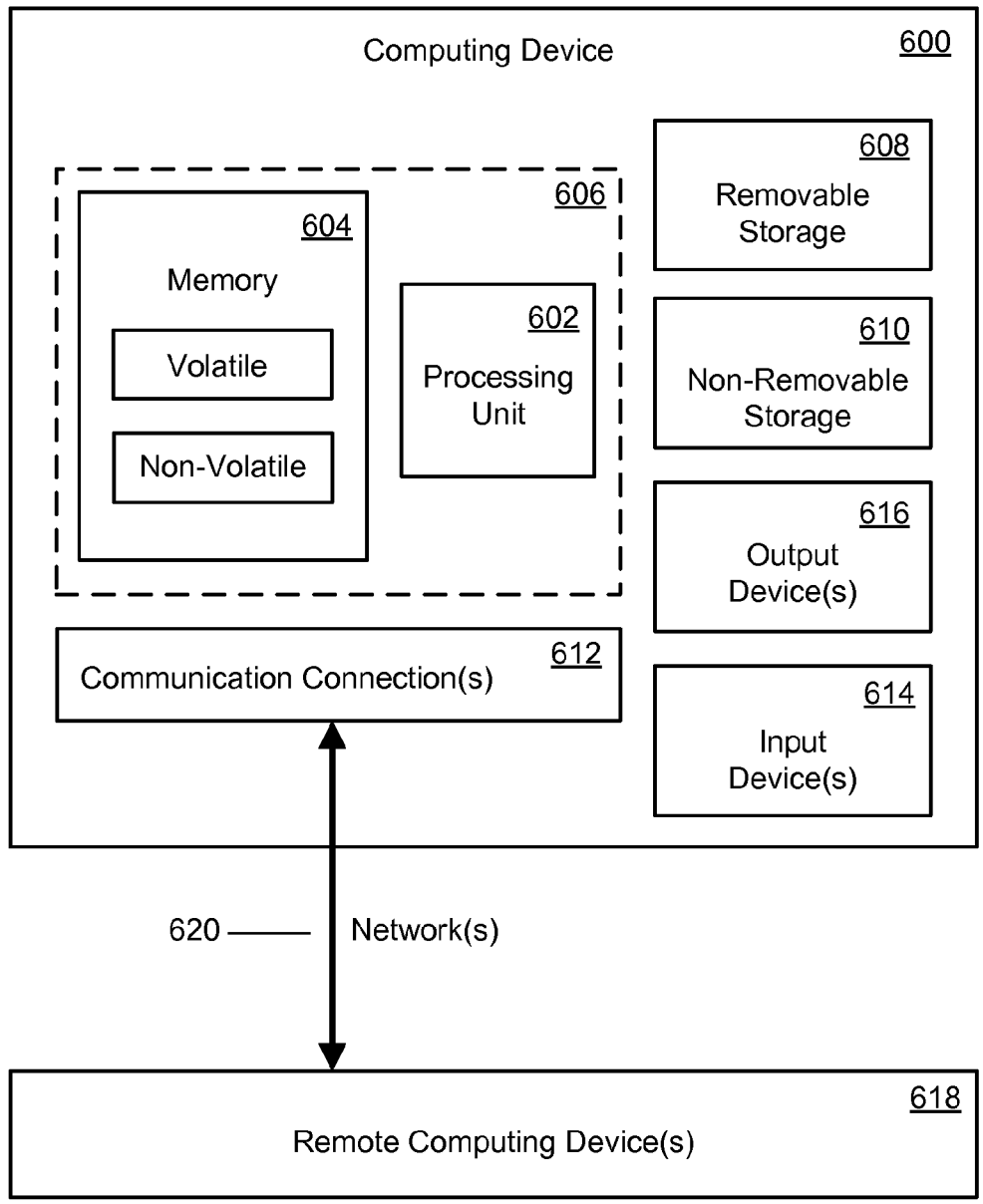
FIG. 6 is a diagram illustrating an exemplary embodiment, in simplified form, of a general purpose, network-based computing device which constitutes an exemplary system for implementing portions of the TOA technique embodiments described herein.

FIG. 6 illustrates an exemplary embodiment, in simplified form, of a suitable computing system environment according to the TOA technique embodiments described herein. The environment illustrated in FIG. 6 is only one example of a suitable computing system environment and is not intended to suggest any limitation as to the scope of use or functionality of the TOA technique embodiments described herein. Neither should the computing system environment be interpreted as having any dependency or requirement relating to any one or combination of components exemplified in FIG. 6.

As exemplified in FIG. 6, an exemplary system for implementing portions of the TOA technique embodiments described herein includes one or more computing devices, such as computing device 600. In its simplest configuration, computing device 600 typically includes at least one processing unit 602 and memory 604. Depending on the specific configuration and type of computing device, the memory 604 can be volatile (such as RAM), non-volatile (such as ROM and flash memory, among others) or some combination of the two. This simplest configuration is illustrated by dashed line 606.

As exemplified in FIG. 6, computing device 600 can also have additional features and functionality. By way of example, computing device 600 can include additional storage such as removable storage 608 and/or non-removable storage 610. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 600 such as computer readable instructions associated with an operating system, application programs and other program modules, and data structures, among other things. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 600. Any such computer storage media can be part of computing device 600.

As exemplified in FIG. 6, computing device 600 also includes a communications connection(s) 612 that allows the device to operate in a networked environment and communicate with a remote computing device(s), such as remote computing device(s) 618. Remote computing device(s) 618 can be any of the aforementioned computing systems, environments, and/or configurations, or can be a router, a peer device, or other common network node, and typically includes many or all of the elements described herein relative to computing device 600. Communication between computing devices takes place over a network(s) 620, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 612 and related network(s) 620 described herein are exemplary and other means of establishing communication between the computing devices can be used.

As exemplified in FIG. 6, communications connection(s) 612 and related network(s) 620 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 6, computing device 600 also includes a user interface which includes one or more input devices 614 and one or more output devices 616. Exemplary input devices 614 include, but are not limited to, a keyboard, mouse, pen, touch input device, audio input device (such as a microphone and the like), and camera, among others. A user can enter commands and various types of information into the computing device 600 through the input device(s) 614. Exemplary output devices 616 include, but are not limited to, a display device(s), printer, and audio output devices (such as one or more loudspeakers, headphones, and the like), among others. These input and output devices are well known and need not be described at length here.

Referring again to FIG. 6, the TOA technique embodiments described herein can be further described and/or implemented in the general context of computer-executable instructions, such as program modules, which are executed by computing device 600. Generally, program modules include routines, programs, objects, components, and data structures, among other things, that perform particular tasks or implement particular abstract data types. The TOA technique embodiments can also be practiced in a distributed computing environment where tasks are performed by one or more remote computing devices 618 that are linked through a communications network 612/620. In a distributed computing environment, program modules can be located in both local and remote computer storage media including, but not limited to, memory 604 and storage devices 608/610.

Wherefore, what is claimed is:

1. A computer-implemented process for delivering online advertisements to one or more users, comprising:
using a computer to perform the following process actions:
the computer receiving an authorization to access one or more data streams for a user, wherein the authorization is granted by the user;
upon receiving notice of the user conducting an online action that initiates a dynamic advertisement (DA) request, the computer using the authorized data streams for the user to generate a customized DA that is relevant to the user, said customized DA generation comprising,
receiving a set of candidate DAs from one or more advertisers,
generating a snapshot of the data within the authorized data streams for the user,
analyzing each of the candidate DAs in the set and selecting a DA therefrom that is relevant to the user, and
modifying the selected DA based on said snapshot and third-party DA customization preferences of other users whose data snapshot is candidate to be integrated into the selected DA; and
the computer delivering the customized DA to the user.

2. The process of claim 1, wherein the data streams for the user are stored within a user data repository comprising at least one of:
a social data store comprising a first data stream for the user that enumerates online friends of the user; or
a calendar data store comprising either a second data stream for the user that specifies a current calendar of the user, or a third data stream for the user that specifies a current calendar of at least one online friend of the user, or both; or
a contact data store comprising either a fourth data stream for the user that specifies ways to contact the user, or a fifth data stream for the user that specifies ways to contact at least one online friend of the user, or both; or
a location data store comprising either a sixth data stream for the user that specifies a current physical location of the user, or a seventh data stream for the user that specifies a current physical location of at least one online friend of the user, or both; or
a computing context data store comprising either an eighth data stream for the user that specifies a current computing context of the user, or a ninth data stream for the user that specifies a current computing context of at least one online friend of the user, or both; or
a purchase history data store comprising either a tenth data stream for the user that specifies a purchase history for the user, or an eleventh data stream for the user that specifies a purchase history for at least one online friend of the user, or both; or
a demographics data store comprising either a twelfth data stream for the user that specifies current demographics of the user, or a thirteenth data stream for the user that specifies current demographics of at least one online friend of the user, or both; or
a companion status data store comprising either a fourteenth data stream for the user that specifies who, if anyone, the user is currently traveling with, or a fifteenth data stream for the user that specifies who, if anyone, at least one online friend of the user is currently traveling with, or both.

3. The process of claim 2, wherein,
the fourth data stream comprises a thumbnail image of the user,
the ways to contact the user comprise at least one of an email address for the user, or a text messaging address for the user, or a phone number for the user,
the fifth data stream comprises a thumbnail image of at least one online friend of the user, and
the ways to contact at least one online friend of the user comprise at least one of an email address for the friend, or a text messaging address for the friend, or a phone number for the friend.

4. The process of claim 2, wherein,
the sixth data stream further specifies at least one of a physical location history for the user, or favorite places of the user, or physical locations the user checked into, or future physical locations the user is planning to be in, and
the seventh data stream further specifies at least one of a physical location history for at least one online friend of the user, or favorite places of at least one online friend of the user, or physical locations at least one online friend of the user checked into, or future physical locations at least one online friend of the user is planning to be in.

5. The process of claim 2, said eighth data stream comprising at least one of,
data from a webpage the user is currently visiting, or
data from a document the user is currently working on, or
data from an online search the user just conducted, or
data from an application the user just launched, or
data from a question the user just submitted to the computer,
said ninth data stream comprising at least one of,
data from a webpage the friend is currently visiting, or
data from a document the friend is currently working on, or
data from an online search the friend just conducted, or
data from an application the friend just launched, or
data from a question the friend just submitted to the computer,
said twelfth data stream comprising at least one of the user's age, or the user's gender, or the user's children, or the user's spouse, and
said thirteenth data stream comprising at least one of the friend's age, or the friend's gender, or the friend's children, or the friend's spouse.

6. The process of claim 2, further comprising at least one of the actions of:
the user directly inputting data about themself into a particular data store; or
upon receiving an authorization to collect a particular type of data about the user, wherein said authorization is granted by the user,
collecting said particular type of data, and
inputting the collected data into the appropriate data store.

7. The process of claim 6, further comprising at least one of the actions of:
receiving a retraction of a previously granted authorization to access a particular data stream for the user, wherein said retraction is entered by the user; or
receiving a retraction of a previously granted authorization to collect a particular type of data about the user, wherein said retraction is entered by the user.

8. The process of claim 1, wherein,
whenever the DA request is initiated by the user requesting a particular webpage, the customized DA is delivered to the user as part of the webpage, whenever the DA request is initiated by the user conducting an online search for a particular type of information, the customized DA is delivered to the user as part of the search results, whenever the DA request is initiated by the user launching a particular application, the customized DA is delivered to the user as part of the application user interface, and whenever the DA request is initiated by the user submitting a question to the computer, the customized DA is delivered to the user as part of the answer to the question.

9. The process of claim 1, further comprising an action of receiving third-party DA customization preferences of the user, wherein, said preferences are specified by the user, the authorized data streams for the user comprise either a first data stream that enumerates online friends of the user, or a second data stream that specifies who, if anyone, the user is currently traveling with, or both, and said preferences either, sanction that the authorized data streams for the user be integrated into customized DAs delivered to any of the online friends of the user and anyone the user is currently traveling with, or prevent the authorized data streams for the user from being integrated into customized DAs delivered to any of the online friends of the user and anyone the user is currently traveling with, or sanction that the authorized data streams for the user be integrated into customized DAs delivered to just a prescribed subset of the online friends of the user and anyone the user is currently traveling with.

10. The process of claim 1, wherein each of the candidate DAs in the set comprises one or more advertiser-provided components, said components comprising at least one of:

a targeting criteria component; or a preferences component; or a snapshot integration executable code component; or a media component.

11. The process of claim 10, wherein, the targeting criteria component of a given candidate DA specifies at least one of, one or more conditions to be met in order for said DA to be selected, or one or more conditions when said DA cannot be selected, the preferences component of a given candidate DA specifies one or more characteristics that are of value to said DA, the snapshot integration executable code component of a given candidate DA comprises logic specifying at least one of how said DA is to be formatted, or how the text of said DA is to read, or how the snapshot of the data within the authorized data streams for the user is to be integrated into said DA, and the media component of a given candidate DA comprises one or more media elements to be integrated into said DA.

12. The process of claim 11, wherein, the characteristics are applied to either a particular authorized data stream for the user, or prescribed values within said data stream, the logic comprises at least one of conditional logic, or one or more overlay images along with instructions on how said images are to be overlaid onto the candidate DA, and each media element comprises either an image, or video, or audio.

13. The process of claim 1, wherein the process action of analyzing each of the candidate DAs in the set and selecting a DA therefrom that is relevant to the user, comprises employing said snapshot to perform said analysis and selection.

14. The process of claim 1, wherein the customized DA comprises at least one of a dislike button or a hyperlink, further comprising the actions of:

upon the user selecting the dislike button, determining that the user disapproves of the customized DA; and upon the user selecting the hyperlink, performing one or more prescribed actions associated with facilitating involvement of the user with what is being advertised in the customized DA.

15. The process of claim 14, said customized DA comprises said dislike button, and wherein the process action of, upon the user selecting the dislike button, determining that the user disapproves of the customized DA comprises an action of either:

asking the user to grant an authorization to access a particular data stream for the user to which access is not yet authorized; or asking the user to grant an authorization to access any one or more of the data streams for the user to which access is not yet authorized.

16. A computer-implemented process for monetizing online advertisements, comprising:

using a computer to perform the following process actions:

the computer receiving an authorization to access one or more data streams for a user, wherein the authorization is granted by the user;

upon receiving notice of the user conducting an online action that initiates a dynamic advertisement (DA) request, the computer using the authorized data streams for the user to generate a customized DA that is relevant to the user, said customized DA generation comprising, receiving a set of candidate DAs from one or more advertisers, wherein each of the candidate DAs in the set comprises an advertiser-provided preferences component that specifies a price the advertiser is willing to pay for delivering the candidate DA to the user, generating a snapshot of the data within the authorized data streams for the user, analyzing each of the candidate DAs in the set and selecting a DA therefrom that is relevant to the user, and modifying the selected DA based on said snapshot and third-party DA customization preferences of other users whose data snapshot is candidate to be integrated into the selected DA, said modification producing the customized DA; and the computer monetizing the customized DA.

17. The process of claim 16, wherein the process action of monetizing the customized DA comprises an action of using the advertiser-provided preferences component of the customized DA to determine what to charge the advertiser for delivering the customized DA to the user.

18. The process of claim 17, wherein the price is specified as one of, a prescribed cost per mile (CPM), or a prescribed cost per action (CPA), or a prescribed CPM increase, or a prescribed CPA increase.

19. A computer-implemented process for delivering online advertisements to one or more users, comprising:

using a computer to perform the following process actions:

the computer receiving an authorization to access one or more data streams for a user, wherein, the authorization is granted by the user, said data streams are stored within a user data repository, and said repository comprises at least one of a social data store, or a calendar data store, or a contact data store, or a location data store, or a computing context data store, or a purchase history data store, or a demographics data store, or a companion status data store;

the computer receiving third-party dynamic advertisement (DA) customization preferences of the user, wherein, the authorized data streams for the user comprise a first data stream that enumerates online friends of the user, and a second data stream that specifies who, if anyone, the user is currently traveling with, and said preferences either, sanction that the authorized data streams for the user be integrated into customized DAs delivered to any of the online friends of the user and anyone the user is currently traveling with, or prevent the authorized data streams for the user from being integrated into customized DAs delivered to any of the online friends of the user and anyone the user is currently traveling with, or sanction that the authorized data streams for the user be integrated into customized DAs delivered to just a prescribed subset of the online friends of the user and anyone the user is currently traveling with;

upon receiving an authorization to collect a particular type of data about the user, the computer collecting said particular type of data, and the computer inputting the collected data into the appropriate data store;

the computer receiving a set of candidate DAs from one or more advertisers;

upon receiving notice of the user conducting an online action that initiates a DA request, the computer analyzing each of the candidate DAs in the set and selecting a DA therefrom that is relevant to the user, the computer generating a snapshot of the data within the authorized data streams for the user, and the computer modifying the selected DA based on said snapshot and third-party DA customization, preferences of other users whose data snapshot is candidate to be integrated into the selected DA, said modification producing a customized DA that is relevant to the user; and the computer delivering the customized DA to the user.

* * * * *